(12) United States Patent
Yoshihara

(10) Patent No.: US 8,201,898 B2
(45) Date of Patent: Jun. 19, 2012

(54) TRACK BELT FOR SNOW VEHICLE AND SNOW VEHICLE

(75) Inventor: Masanori Yoshihara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/767,863

(22) Filed: Apr. 27, 2010

(65) Prior Publication Data

US 2011/0259654 A1 Oct. 27, 2011

(51) Int. Cl.
*B62D 55/24* (2006.01)
(52) U.S. Cl. .................. 305/167; 305/165; 305/178
(58) Field of Classification Search .............. 305/124, 305/125, 127, 128, 129, 132, 157, 165, 167, 305/169, 173, 174, 178, 185
See application file for complete search history.

(56) References Cited

U.S. PATENT DOCUMENTS

| 4,687,261 | A | * | 8/1987 | Atkin .......................... 305/196 |
| 6,505,896 | B1 | | 1/2003 | Boivin et al. |
| 6,935,708 | B2 | * | 8/2005 | Courtemanche ............. 305/165 |
| 7,048,344 | B2 | * | 5/2006 | Courtemanche ............. 305/165 |
| 7,523,799 | B2 | * | 4/2009 | Yoshihara ..................... 180/190 |
| 7,784,571 | B2 | * | 8/2010 | Brazier ......................... 180/9.44 |
| 2002/0033643 | A1 | * | 3/2002 | Soucy et al. .................. 305/178 |
| 2004/0004395 | A1 | * | 1/2004 | Soucy et al. .................. 305/178 |

FOREIGN PATENT DOCUMENTS

| JP | 62214065 | A | * | 9/1987 |
| JP | 62214068 | A | * | 9/1987 |

* cited by examiner

*Primary Examiner* — Kip T Kotter
(74) *Attorney, Agent, or Firm* — Keating & Bennett, LLP

(57) ABSTRACT

A track belt for a snow vehicle includes a belt body, a first lug, outer end circumferential regions, and contacting portions. The first lug is disposed at a central portion in a right/left direction of the belt body. The outer end circumferential regions are provided at both end portions in the right and left directions of the belt body, and include second lugs each having a height from the outer circumferential surface being no more than a half of a height of the first lug, or do not include lugs protruded from the outer circumferential surface of the belt body. The contacting portions are provided at the inner circumferential surface such that positions of the contacting portions in the right/left direction overlap with the outer end circumferential regions and are arranged to contact a rotating wheel member that opposes a snow surface across the belt body.

18 Claims, 10 Drawing Sheets

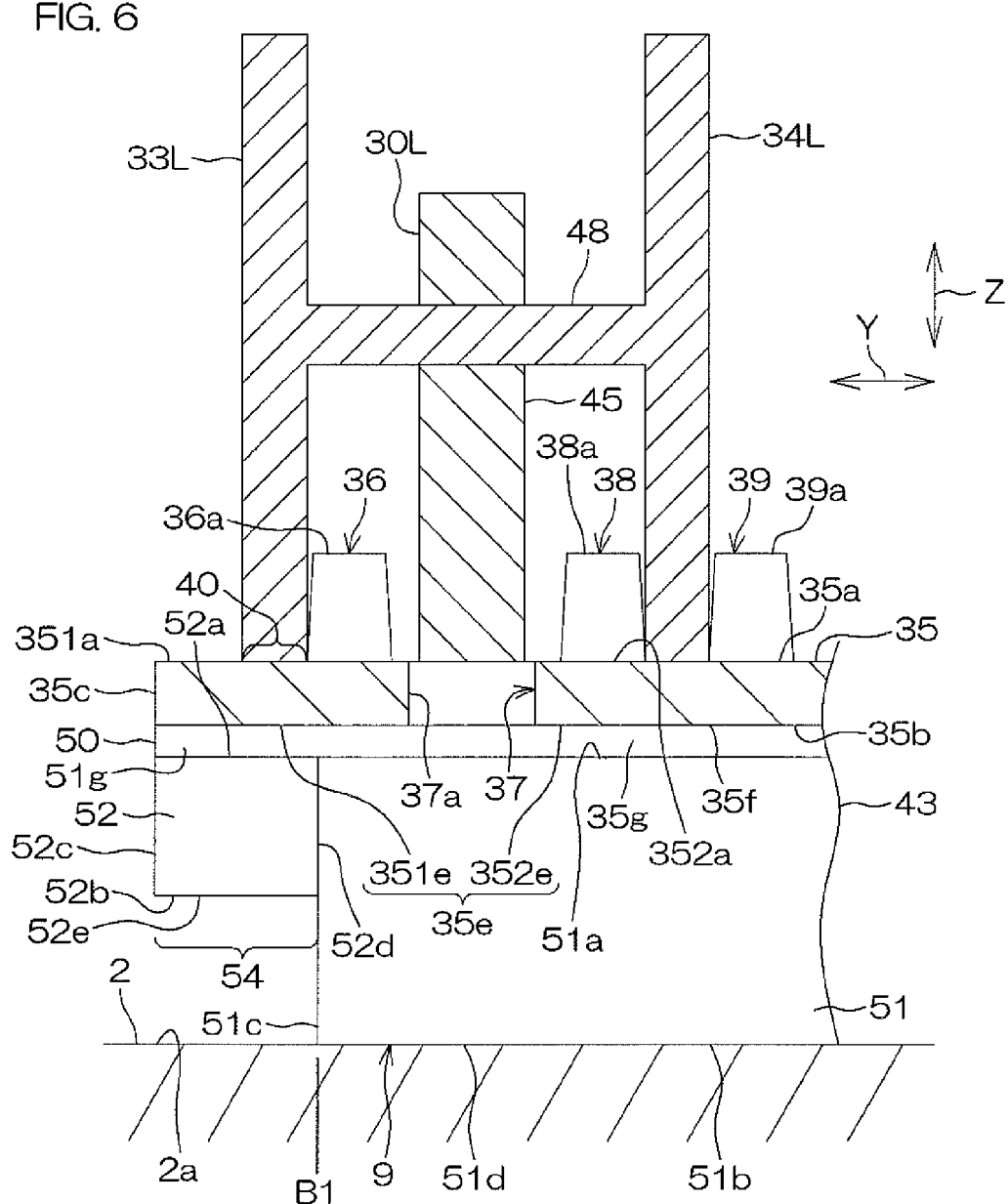

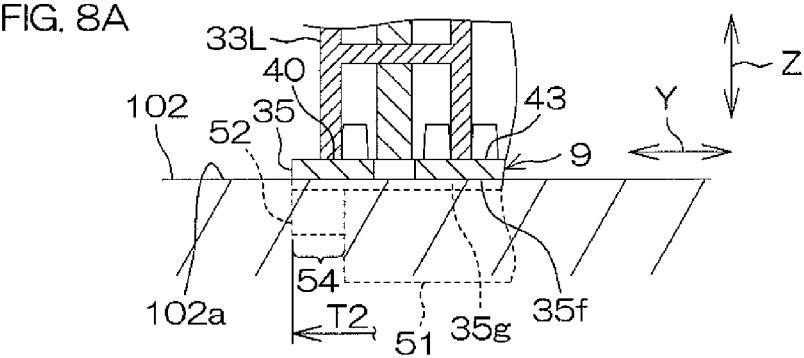
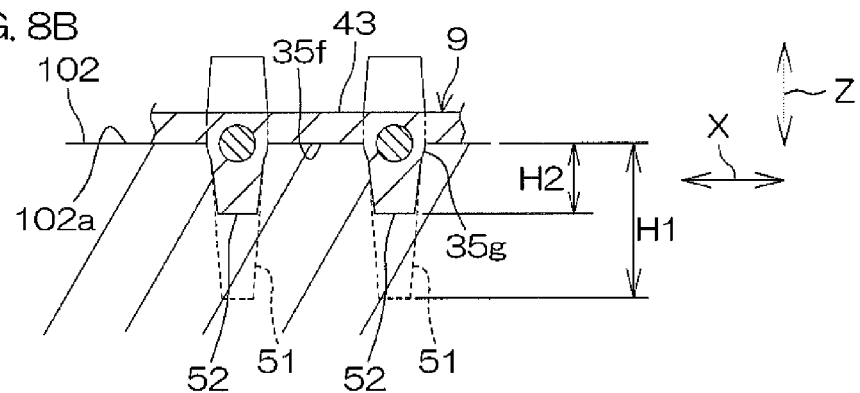
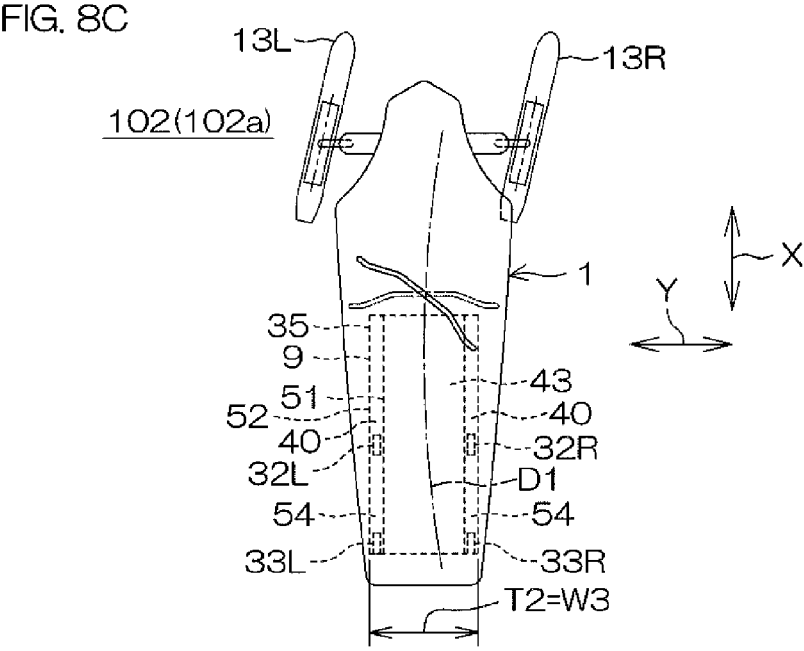

TRACK BELT FOR SNOW VEHICLE AND SNOW VEHICLE

BACKGROUND OF THE INVENTION

1. Field of the Invention

The present invention relates to a track belt for snow vehicle and a snow vehicle.

2. Description of the Related Art

A snow vehicle, such as a snowmobile, includes an endless track belt arranged at a rear portion of a vehicle body. A plurality of lugs protrude from an outer circumferential surface of the track belt. The track belt is driven by an output of an engine, and the lugs grip the snow. A propulsive force thereby arises in the snow vehicle.

A track belt for a recreational snowmobile is described in U.S. Pat. No. 6,505,896. When viewed in a circumferential direction of the track belt, tip portions of a plurality of lugs are convexly curved in arcuate form as a whole. According to the track belt having such lugs when traveling on soft snow, the entire lugs are embedded in the snow, and straight travel and turning travel by tilting of the vehicle body are enabled.

SUMMARY OF THE INVENTION

The inventor of preferred embodiments of the present invention described and claimed in the present application conducted an extensive study and research regarding a track belt for snow vehicle, such as the one described above, and in doing so, discovered and first recognized new unique challenges and previously unrecognized possibilities for enhancements as described in greater detail below.

However, when the snowmobile of U.S. Pat. No. 6,505,896 travels on an ice road surface, only the tips of the lugs of the track belt contact the ice road surface and a belt body does not contact the ice road surface. Here, a contact width (contact length in a right/let direction) with respect to the ice road surface is extremely short because the tip portions of the plurality of lugs are convexly curved in arcuate form as a whole. The track belt according to U.S. Pat. No. 6,505,896 thus presents enhancement opportunities for the snowmobile with regard to straight travel performance on a hard road surface, such as the ice road surface.

The track belt according to U.S. Pat. No. 6,505,896 is thus suitable for travel on soft snow but presents enhancement opportunities for travel on a hard ice road surface. That is, although the track belt is suitable for travel on a road surface of a specific snow quality, it may present enhancement opportunities for travel on a road surface of snow quality that differs from the specific snow quality.

On the other hand, snow road conditions are diverse, and there are ice roads formed of hard ice, hard-packed snow roads formed of hardened snow (hard-packed snow), as well as soft snow roads formed by accumulation of freshly-fallen snow. Thus, numerous models are present according to regions that differ in snow quality and usage modes. If a track belt can be realized with which both straight travel and turning travel can be performed efficiently on ice roads, hard-packed snow roads and soft snow roads, travel on snow roads of different snow qualities can be enabled with a single snow vehicle. It also becomes possible to accommodate different usage modes (recreation, cargo handling, etc.) with a single snow vehicle. Versatility of the snow vehicle is thereby widened. Widening of the versatility of the snow vehicle is especially favorable for a snow vehicle for cargo handling that is used regardless of the type of snow road.

In order to overcome the previously unrecognized and unsolved challenges described above, a preferred embodiment of the present invention provides a track belt for snow vehicle that includes a belt body, a first lug, outer end circumferential regions, and contacting portions. The belt body is arranged to an endless form having an outer circumferential surface and an inner circumferential surface. The first lug protrudes from the outer circumferential surface, is disposed at a central portion in a right/left direction of the belt body, and has a flat portion, which is substantially flat with respect to the right/left direction, arranged at a tip edge portion of the first lug. The outer end circumferential regions are provided across an entire range in a circumferential direction of the belt body at both end portions in the right/left direction of the belt body, and include second lugs each having a height from the outer circumferential surface that is no more than a half of a height of the first lug, or do not include lugs protruded from the outer circumferential surface. The contacting portions are provided at the inner circumferential surface such that positions of the contacting portions in the right/left direction overlap with the outer end circumferential regions and are arranged to contact a rotating wheel member that opposes a snow surface across the belt body.

A snow vehicle that includes the track belt can efficiently perform straight travel and turning travel while traveling on any of ice roads (hard snow roads) formed of hard ice, hard-packed snow roads formed of hardened snow (hard-packed snow), and soft snow roads formed of soft snow (powder snow). Different models thus do not have to be prepared according to regions differing in snow quality and usage modes. That is, the snow vehicle can be widened in versatility because regions differing in snow quality and usage modes can be accommodated with a single model.

When the snow vehicle performs turning travel on an ice road, a contact portion of the track belt with respect to a surface of the ice road slips less with respect to the surface of the ice road the closer its location is to a center in the right/left direction and slips more in a front/rear direction with respect to the surface of the ice road the closer its location is to an end portion in the right/left direction. Thus, if the outer end circumferential regions of the track belt contact the ice road, a large drive loss is caused by the ice road when the snow vehicle performs turning travel on the ice road.

According to the present preferred embodiment of the present invention, when the snow vehicle travels on the ice road, although the first lug, arranged at the central portion in the right/left direction, contacts the surface of the ice road (snow surface), the outer end circumferential regions do not contact the surface of the ice road. The first lug is arranged at the central portion in the right/left direction and is thus small in resistive force due to grazing of the surface of the ice road during the turning of the snow vehicle. Thus, when the snow vehicle turns on the surface of the ice road, the resistive force that the track belt receives from the surface of the ice road is small and the snow vehicle can be turned readily with a small force. As a result of the resistive force received by the snow vehicle from the surface of the ice road being small, a force (steering load) necessary for steering the snow vehicle can also be made small.

The flat portion that is substantially flat with respect to the right/left direction of the track belt is arranged at the tip edge portion of the first lug. By the flat portion contacting the surface of the ice road, tilting of the track belt to the right and left can be prevented. The snow vehicle can thus be made to perform straight travel with stability on the ice road.

When the snow vehicle travels on a hard-packed snow road, the first lug (and the second lugs in the case where the second lugs are provided) becomes embedded in the hard-packed snow road. On the other hand, the outer circumferential surface at a lower portion of the belt body is put in contact across its entire range in the right/left direction with the surface of the hard-packed snow road. A contact length (stance width) in the right/left direction of the track belt and the surface of the hard-packed snow road can thus be made adequately long. Moreover, the positions of the contacting portions with respect to the right/left direction are arranged so as to overlap with the outer end circumferential regions. The outer end circumferential regions can thus be pressed against the surface of the hard-packed snow road reliably by contact of the rotating wheel member and the contacting portions. Consequently, the state of long stance width can be maintained more reliably. Riding comfort during turning of the snow vehicle can thus be enhanced and the snow vehicle can be turned at higher speed and more efficiently.

The first lug that is embedded in the hard-packed snow road is arranged at the central portion with respect to the right/left direction of the track belt and is thus small in the resistance received from the hard-packed snow road during the turning of the snow vehicle. In the case where the second lugs are provided, although the second lugs are arranged at the outer end circumferential regions of the track belt and become embedded in the hard-packed snow road, the height of the second lugs is no more than half the height of the first lug. The resistance that the outer end circumferential regions receive from the hard-packed snow road during the turning of the snow vehicle is thus small. In the case where the second lugs are not provided, the resistance that the outer end circumferential regions receive from the hard-packed snow road during the turning of the snow vehicle is even smaller. Thus, even if the first lug (and the second lugs in the case where the second lugs are provided) is embedded in the hard-packed snow road, the resistance that the track belt receives from the hard-packed snow road during the turning of the vehicle is small and the snow vehicle can thus be turned readily with a low force.

Further, the lower portion of the outer circumferential surface of the belt body is put in contact across its entire range in the right/left direction with the surface of the hard-packed snow road. Tilting of the belt body with respect to the surface of the hard-packed snow road can thus be prevented and the snow vehicle can thus be made to perform straight travel with stability on the hard-packed snow road.

When the snow vehicle travels on a soft snow road, the first lug (and the second lugs in the case where the second lugs are provided) becomes embedded in the soft snow road and the lower portion of the belt body also becomes embedded in the soft snow road. The outer circumferential surface at the lower portion of the belt body is then put in contact across its entire range with the soft snow road. By the rotating wheel member pressing the contacting portions, a wide region of the outer circumferential surface of the belt body, including the outer end circumferential regions, can be pressed reliably against the soft snow road. Consequently, a buoyant force, which is an upward force that the track belt receives from the soft snow road, can be made large. Thus, even during travel on the soft snow road, the snow vehicle can be driven forward or driven in reverse without becoming stuck and the snow vehicle can thus be made to perform straight travel with stability.

In the case where the second lugs are provided, although the second lugs are arranged at the outer end circumferential regions of the track belt, the height of the second lugs is no more than half the height of the first lug. The drive resistance that the outer end circumferential regions of the track belt receive from the soft snow road during the turning of the snow vehicle is thus small. In the case where the second lugs are not provided, the resistance that the outer end circumferential regions receive from the soft snow road during the turning of the snow vehicle is even smaller. Consequently, when the snow vehicle turns on the soft snow road, the entire snow vehicle, including the track belt, can be tilted readily and the snow vehicle can thus be made to perform turning travel efficiently even during travel on the soft snow road.

Preferably, a preferred embodiment of the present invention includes a protrusion that protrudes on an inner side of the belt body and is adjacent to the rotating wheel member in the right/left direction.

According to this arrangement, the protrusion is adjacent to the rotating wheel member and the rotating wheel member is thus prevented from being displaced in the right/left direction with respect to the belt body. The state where the rotating wheel member opposes the outer end circumferential regions can thereby be maintained reliably.

Preferably, in a preferred embodiment of the present invention, the first lug includes end edge portions substantially orthogonal to the outer circumferential surface at boundary positions of the outer end circumferential regions, and the first lug and the outer end circumferential regions are made continuous in a stepped manner.

According to this arrangement, the first lug and the outer end circumferential regions are partitioned clearly. On the ice road, a state where the first lug contacts the surface of the ice road and the outer end circumferential regions do not contact the surface of the ice road can thereby be realized reliably. Further, the track belt can be tilted readily when making the snow vehicle turn on the ice road, the hard-packed snow road, or the soft snow road. Turning operation of the snow vehicle can thus be made more efficient.

Preferably, in a preferred embodiment of the present invention, the height of the second lugs from the outer circumferential surface is no more than three times a thickness of the belt body.

Whereas when the height of the second lugs is greater than three times the belt body, the second lugs become too high in flexibility, the second lugs can be made difficult to deflect by the arrangement described above. Thus, on the hard-packed snow road, the second lugs can be pierced into the hard-packed snow road more reliably. The second lugs can thus be prevented from deflecting on the surface of the hard-packed snow road and not piercing into the hard-packed snow road due to deflection, and floating of the outer circumferential surface at end portions of the belt body from the surface of the hard-packed snow road can thus be prevented. On the hard-packed snow road, the stance width of the track belt can be made adequately long because the outer circumferential surface at both end portions of the belt body is grounded reliably on the surface of the hard-packed snow road. The riding comfort during turning of the snow vehicle can thus be enhanced and the snow vehicle can be turned efficiently at higher speed. Moreover, because the second lugs are made difficult to deflect, the second lugs can grip the hard-packed snow road with a strong force when the snow vehicle performs straight travel. The snow vehicle can thus be driven forward or in reverse forcefully on the hard-packed snow road.

Preferably, in a preferred embodiment of the present invention, a tip edge portion of each second lug includes a flat portion that is flat with respect to the right/left direction.

When performing turning travel on the hard-packed snow road or the soft snow road, the snow vehicle may turn while skidding with respect to the hard-packed snow road or the soft snow road.

According to the above arrangement, when the snow vehicle skids on the hard-packed snow road or the soft snow road, the flat portions of the second lugs can slide smoothly with respect to the hard-packed snow road or the soft snow road. The second lugs can thus be prevented from piercing into the hard-packed snow road or the soft snow road, and thus a contribution can be made toward improving maneuverability when the snow vehicle is made to travel while skidding. The second lugs are disposed at end portions of the belt body and thus have a large influence on turning performance. The maneuverability of the snow vehicle can be enhanced because the second lugs have a structure that can prevent piercing into the hard-packed snow road or the soft snow road.

The second lugs may have a height from the outer circumferential surface of the belt body that is no more than three times the thickness of the belt body and a tip edge portion of each second lug may include a flat portion that is flat with respect to the right/left direction. In this case, the second lugs are made difficult to deflect and the tip edge portions of the second lugs are made unlikely to pierce into the hard-packed snow road or the soft snow road. Thus, when the snow vehicle is performing straight travel on the hard-packed snow road or the soft snow road, the second lugs grip the hard-packed snow road or the soft snow road strongly such that the snow vehicle can be driven forward or in reverse reliably. Further, when the snow vehicle skids (performs turning travel) on the hard-packed snow road or the soft snow road, the tip edge portions of the second lug can be made unlikely to pierce into the hard-packed snow road or the soft snow road and resistance in the right/left direction is therefore low. The snow vehicle can thus be made to turn smoothly.

Preferably, a preferred embodiment of the present invention includes a reinforcing member arranged to extend in the right/left direction and at least partially embedded in the belt body. The first lug and the second lugs are matched in position in a circumferential direction with the reinforcing member.

According to this arrangement, the belt body can be increased in strength in vicinities of the first lug and the second lugs. By the reinforcing member being arranged in the vicinities of the first lug and the second lugs, which are the portions of the track belt that receive a large load from the ice road, the hard-packed snow road, or the soft snow road, the effect of enhancing the strength of the track belt by the providing of the reinforcing member can be enhanced further.

For example, the belt body may include a reinforcing member embedded portion in which the reinforcing member is embedded, and an outer circumferential surface of the reinforcing member embedded portion may bulge toward an outer side of the belt body in accordance with an outer shape of the reinforcing member. In this case, a thicker reinforcing member can be used and the effect of reinforcing the belt body can be enhanced further.

Although the outer circumferential surface of the reinforcing member embedded portion bulges toward the outer side of the belt body, it is still the outer circumferential surface of the belt body and does not function as a lug. To describe a difference between the outer circumferential surface of the reinforcing member embedded portion and a lug, on the hard-packed snow road, the outer circumferential surface of the reinforcing member embedded portion is not pierced into the hard-packed snow road. On the other hand, on the hard-packed snow road, a lug is pierced into the hard-pack snow road.

Preferably, in a preferred embodiment of the present invention, a plurality of through holes disposed at both sides of the belt body in the right/left direction aligned at substantially equal intervals in the circumferential direction and arranged to engage with a sprocket are provided in the belt body. The outer end circumferential regions are arranged at outer sides of the respective through holes of the belt body in the right/left direction.

According to this arrangement, a tensile force is applied to the belt body by rotation of the sprocket. The outer end circumferential regions can thus be arranged near portions of the belt body that receive the tensile force from the sprocket. The outer end circumferential regions can thereby be made unlikely to slacken and a state where the outer end circumferential regions are extended straightly can be maintained readily. Consequently, the state of contact of the track belt with each of the ice road, hard-packed snow road, and soft snow road can be made to approach designed states reliably.

A snow vehicle according to another preferred embodiment of the present invention includes a vehicle body, a track belt according to a preferred embodiment described above arranged at a lower rear side of the vehicle body, and a rotating wheel member arranged to contact the contacting portions of the belt body and to oppose a snow surface across the belt body.

According to this arrangement, a snow vehicle capable of performing straight travel and turning travel efficiently when traveling on any of ice roads, hard-packed snow roads, and soft snow roads can be realized.

Preferably, in a preferred embodiment of the present invention, the rotating wheel member is arranged to oppose a rear end portion of a grounded region at which the track belt contacts the snow surface.

According to this arrangement, the rotating wheel member is arranged to oppose the rear end portion of the grounded region. By the rotating wheel member being disposed to oppose the rear end portion of the grounded region, floating of the track belt at a vicinity of the rotating wheel member can be prevented. A state where the rear end portion of the grounded region is located at a more rearward portion of the snow vehicle and respective right and left ends of the grounded regions are located at positions closer to respective right and left ends of the snow vehicle can thereby be maintained. A state in which the grounded region is broad can thus be maintained reliably. Thus, when the snow vehicle is to perform straight travel, the snow vehicle can be driven forward or in reverse forcefully, and in making the snow vehicle turn, the turning can be performed at higher speed.

Other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a sectional view of principal portions taken along line VI-VI in FIG. 4 and shows a section of the track belt as viewed in a front/rear direction.

FIG. 8A is a sectional view of principal portions of the track belt as viewed along the front/rear direction in a case where the snowmobile travels on a hard-packed snow road.

FIG. 8B is a sectional view of principal portions of the track belt as viewed along the right/left direction in the case where the snowmobile travels on the hard-packed snow road.

FIG. 8C is a plan view of the snowmobile during travel on the hard-packed snow road.

DETAILED DESCRIPTION OF THE PREFERRED EMBODIMENTS

With each of the preferred embodiments described below, a snowmobile shall be described as an example of a snow vehicle. However, the present invention can also be applied to snow vehicles other than a snowmobile.

Figure 1:
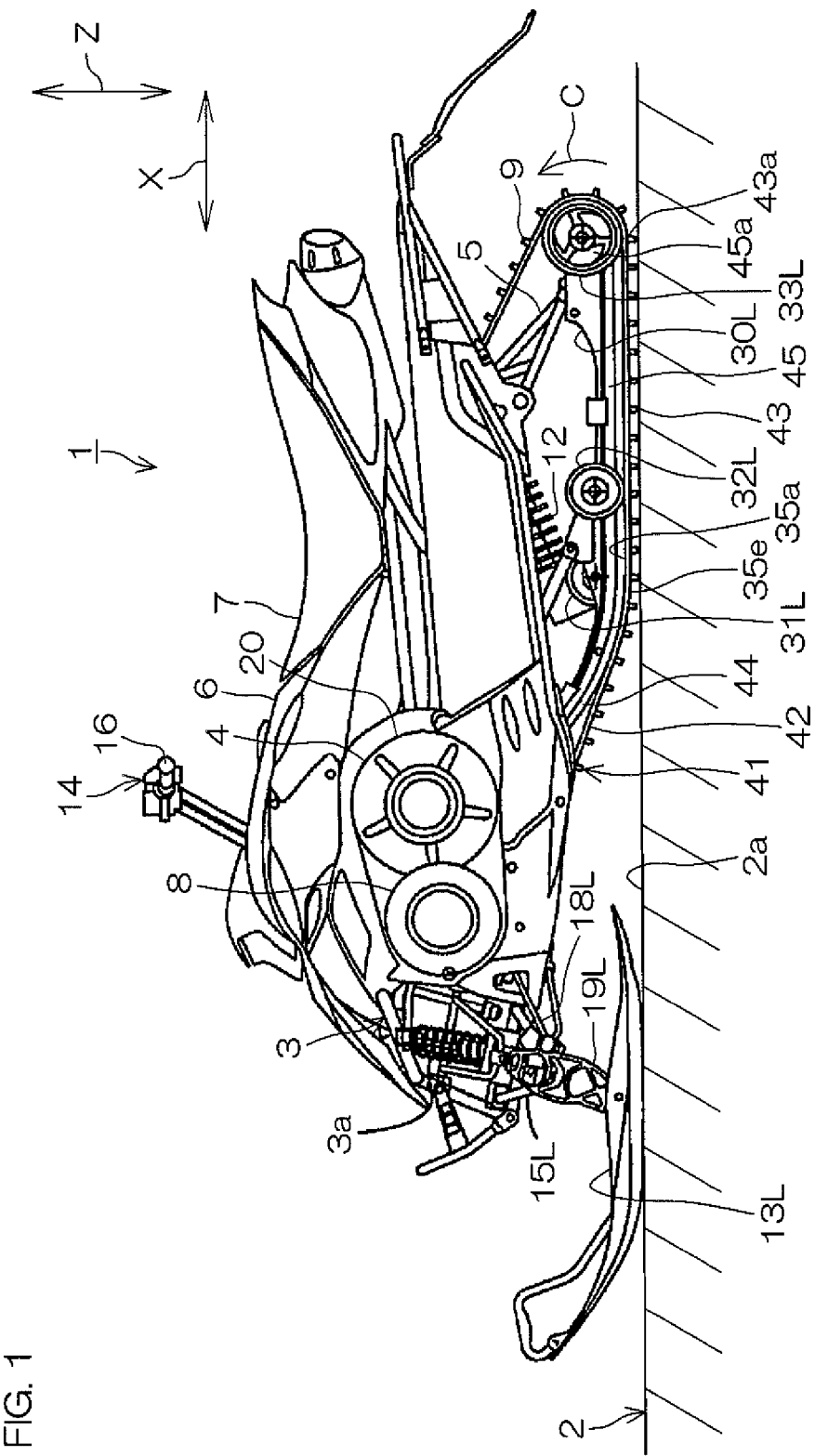
FIG. 1 is a left side view of a snowmobile according to a preferred embodiment of the present invention.

FIG. 1 is a left side view of a snowmobile 1 according to a preferred embodiment of the present invention. In the present preferred embodiment, "front/rear direction," "right/left direction," and "up/down direction" are based on a frame of reference of a driver when the snowmobile 1 is in a reference orientation of being placed on surface 2a of a horizontal ice road 2 in a straight drive state and the driver is facing forward. The ice road 2 is a road formed by hardening of snow, and the surface 2a of the ice road 2 is an example of a "snow surface."

The snowmobile 1 includes a vehicle body 3, which is long with respect to the front/rear direction X, a drive apparatus 4 attached to the vehicle body 3, and a rear suspension device 5 attached to a rear portion of the vehicle body 3.

The vehicle body 3 is arranged using pipe materials, steel plates, etc. A portion of the vehicle body 3 is covered by a vehicle body cover 6. A seat 7 for seating of a rider is arranged at an upper portion of the vehicle body 3.

The drive apparatus 4 generates a driving force that drives the snowmobile 1 forward or in reverse. The drive apparatus 4 includes an engine 8, a transmission device (not shown in FIG. 1) that changes an output rotation of a crankshaft of the engine 8, and a track belt 9 that is rotatingly driven by an output of the transmission device. The engine 8 is, for example, a four-cycle, multi-cylinder engine and is arranged at a front portion 3a of the vehicle body 3.

The track belt 9 is an endless belt arranged to have a fixed width with respect to the right/left direction, and is arranged at a lower rear side of the vehicle body 3. By rotation of the track belt 9, a forward driving force or a reverse driving force acts on the vehicle body 3. A slide rail 30L is in slidable contact with an inner circumference of the track belt 9. A plurality of rotating wheel members, such as rotating wheel members 31L, 32L, 33L, etc., are arranged at the inner circumference of the track belt 9, and the track belt 9 is wound around the rotating wheel members 31L, 32L, and 33L.

The rear suspension device 5 includes a cushioning member 12 and alleviates vibration and impact that act on the vehicle body 3 from the track belt 9.

Figure 2:
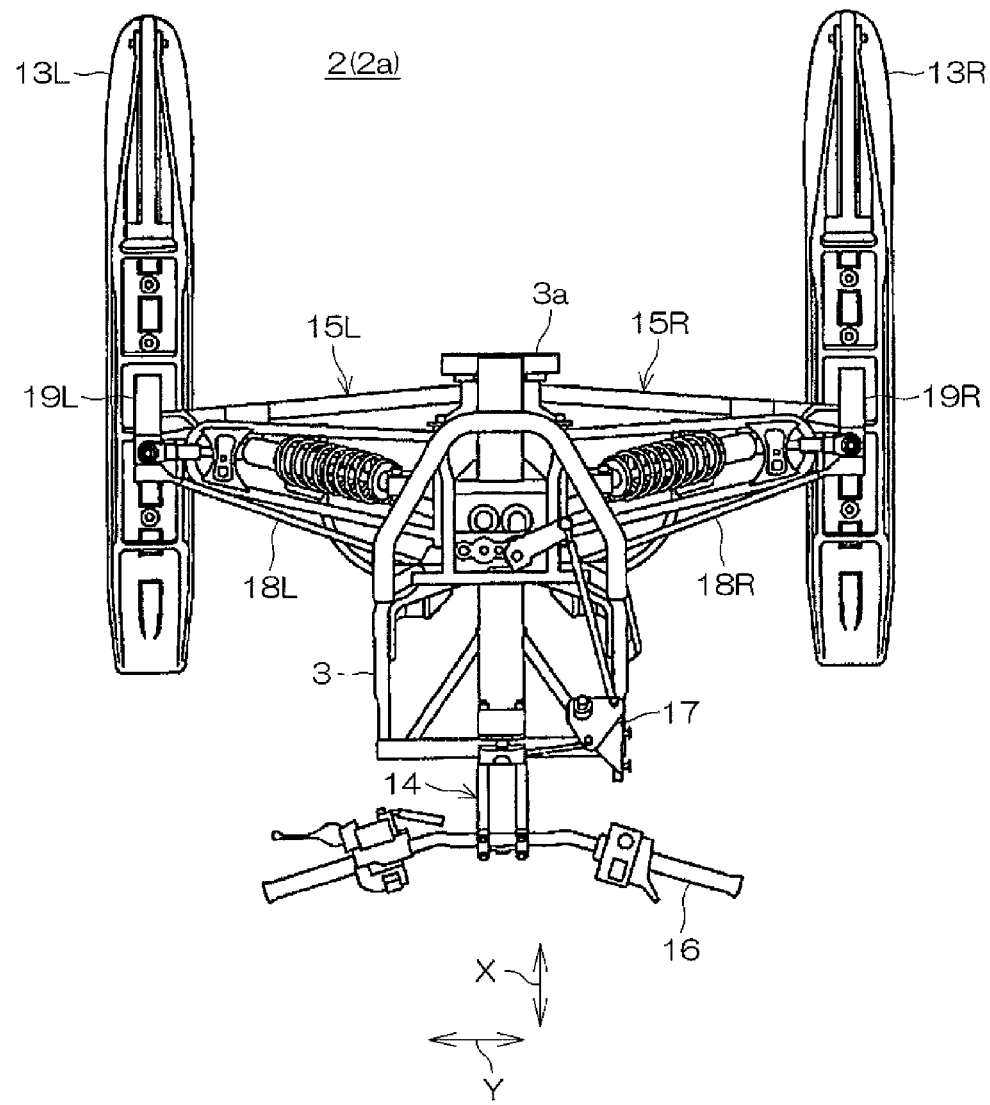
FIG. 2 is a plan view of an arrangement of principal portions of a front portion of the snowmobile.

FIG. 2 is a plan view of an arrangement of principal portions of the front portion 3a of the snowmobile 1. The snowmobile 1 includes a pair of right and left ski members 13R and 13L arranged at the front portion 3a side of the vehicle body 3, a steering apparatus 14 arranged to control directions of the pair of ski members 13R and 13L, and a pair of right and left front suspension devices 15R and 15L.

The pair of ski members 13R and 13L can slide on the surface 2a of the ice road 2. Each of the ski members 13R and 13L extends elongately with respect to the front/rear direction X and is grounded on the surface 2a of the ice road 2.

The steering apparatus 14 includes a handle 16, a link mechanism 17, to which a displacement of the handle 16 is transmitted, a pair of right and left tie rods 18R and 18L coupled to the link mechanism 17, and a pair of knuckles 19R and 19L connected to the pair of right and left tie rods 18R and 18L, respectively. The corresponding ski members 13R and 13L are respectively coupled to the knuckles 19R and 19L.

The handle 16 is a bar that is arranged at an upper portion of the vehicle body 3, is long with respect to the right/left direction, and is pivoted clockwise or counterclockwise by operation by the driver.

The pivoting of the handle 16 by operation by the driver is converted to a rectilinear motion in the right/left direction Y by the link mechanism 17 and is transmitted to the pair of tie rods 18R and 18L. The pair of tie rods 18R and 18L are thereby displaced to the right and left, and the directions of the pair of knuckles 19R and 19L and the pair of ski members 13R and 13L change. The snowmobile can thereby turned to the right (clockwise) or to the left (counterclockwise).

The pair of front suspension devices 15R and 15L are arranged at the respective right and left sides of the front portion 3a of the vehicle body 3. The right side front suspension device 15R is positioned between a right front portion of the vehicle body 3 and the right side ski member 13R and alleviates vibration and impact acting on the vehicle body 3 from the right side ski member 13R. The left side front suspension device 15L is positioned between a left front portion of the vehicle body 3 and the left side ski member 13L and alleviates vibration and impact acting on the vehicle body 3 from the left side ski member 13L.

Figure 3:
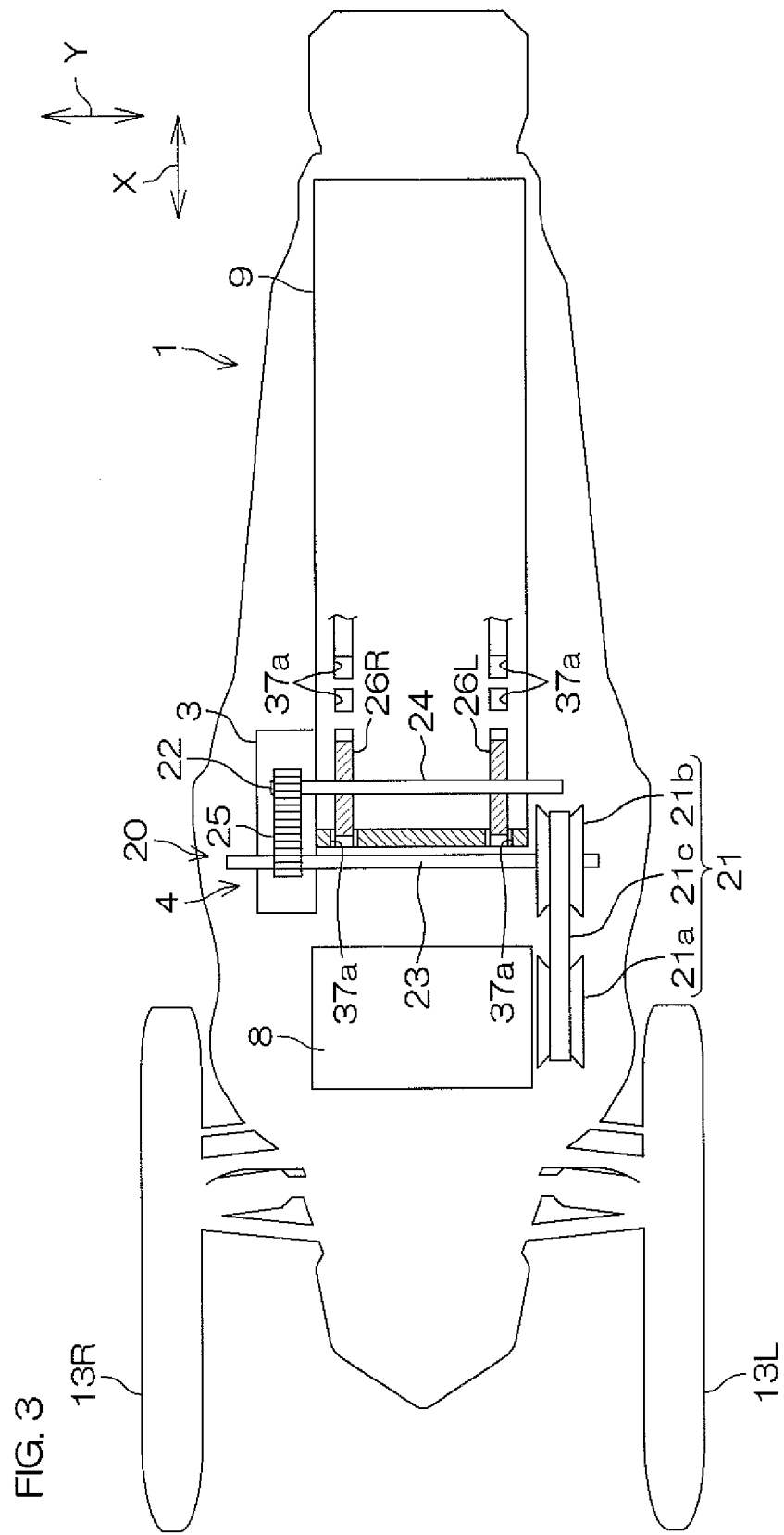
FIG. 3 is a schematic plan view of the snowmobile for explaining a drive apparatus.

FIG. 3 is a schematic plan view of the snowmobile 1 for explaining the drive apparatus 4. In the vehicle body 3, a transmission device 20 is arranged to the rear of the engine 8. The transmission device 20 includes a primary transmission 21 and a secondary transmission 22.

The primary transmission 21 includes a primary pulley 21a rotated by the output of the crankshaft (not shown) of the engine 8 and a secondary pulley 21b. The primary transmission 21 also includes a V-belt 21c wound around the primary pulley 21a and the secondary pulley 21b.

The primary pulley 21a is arranged such that a groove width of the primary pulley 21a can be changed. Also, the secondary pulley 21b is arranged such that a groove width of the secondary pulley 21b can be changed.

Positions of engagement of the V-belt 21c with the primary pulley 21a and the secondary pulley 21b are displaced in accordance with changes of the respective groove widths of the primary pulley 21a and the secondary pulley 21b. A transmission gear ratio is thereby changed steplessly.

The secondary pulley 21b is coupled in an integrally rotatable manner to a left end of a secondary shaft 23 arranged at the rear of the engine 8 and extends in the right/left direction Y. The secondary shaft 23 is rotatably supported by the vehicle body 3.

A driveshaft 24 is arranged parallel to the secondary shaft 23 at a rear side of the secondary shaft 23. The driveshaft 24 is rotatably supported by the vehicle body 3.

Figure 4:
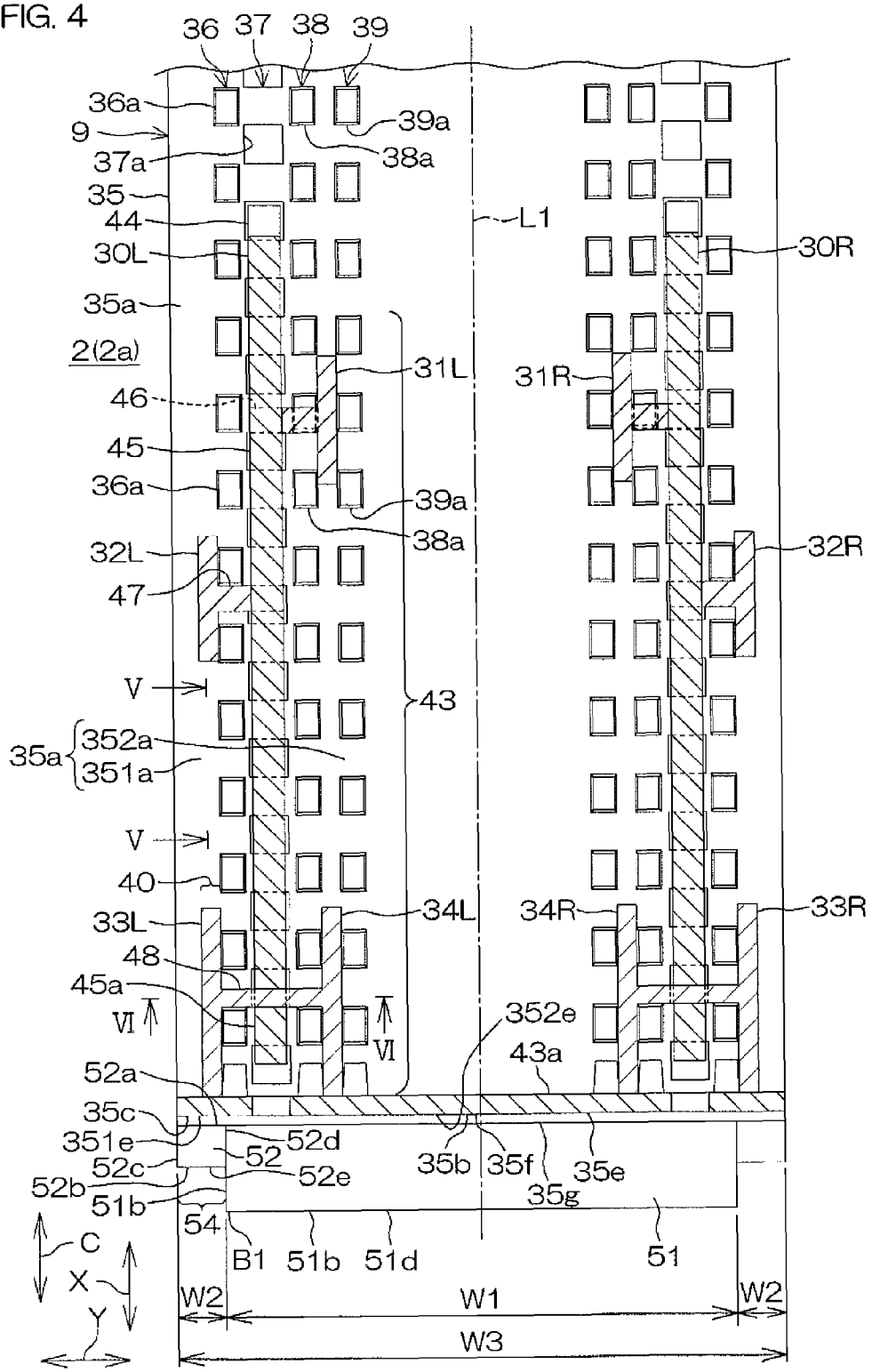
FIG. 4 is a schematic plan view of an arrangement of principal portions in a vicinity of a track belt.

The secondary transmission 22 includes a drive gear (not shown) provided at a right end of the secondary shaft 23, a driven gear provided at a right end of the driveshaft 24, and a sprocket chain 25 wound around both gears. By rotation of the sprocket chain 25, a rotational force of the secondary shaft 23 is transmitted to the driveshaft 24 upon being shifted in rotational speed. The rotation of the driveshaft 24 is transmitted to the track belt 9 via a pair of drive sprockets 26R and 26L attached to the driveshaft 24, and the track belt 9 is thereby rotated FIG. 4 is a schematic plan view of an arrangement of principal portions in a vicinity of the track belt 9. The track belt 9 is pressed toward the surface 2a side of the ice road 2 by the slide rails 30R and 30L, first rotating wheel members 31R and 31L, second rotating wheel members 32R and 32L, third rotating wheel members 33R and 33L, and fourth rotating wheel members 34R and 34L. Each of the second rotating wheel members 32R and 32L and the third rotating wheel members 33R and 33L is an example of a "rotating wheel member" of the present invention.

The first rotating wheel members 31R and 31L, the second rotating wheel members 32R and 32L, the third rotating wheel members 33R and 33L, and the fourth rotating wheel members 34R and 34L respectively oppose the surface 2a of the ice road 2 across the track belt 9.

The track belt 9 is arranged right/left symmetrically on basis of a reference line L1 extends in the front/rear direction X along a center of the track belt 9 in the right/left direction Y. Also, the slide rails 30R and 30L are arranged right/left symmetrically on the basis of the reference line L1. Likewise, the first rotating wheel members 31R and 31L, the second rotating wheel members 32R and 32L, the third rotating wheel members 33R and 33L, and the fourth rotating wheel members 34R and 34L are respectively disposed right/left symmetrically on the basis of the reference line L1.

Thus, in the description that follows, a left half portion of the track belt 9, the left side slide rail 30L, the left side first rotating wheel member 31L, the left side second rotating wheel member 32L, the left side third rotating wheel member 33L, and the left side fourth rotating wheel member 34L shall mainly be described. Detailed description of a right half portion of the track belt 9, the right side slide rail 30R, the right side first rotating wheel member 31R, the right side second rotating wheel member 32R, the right side third rotating wheel member 33R, and the right side fourth rotating wheel member 34R shall be omitted.

The track belt 9 includes the belt body 35. The belt body 35 is arranged, for example, from a material with which a core material including a resin and glass fibers is embedded in rubber, and is formed to an endless form. A lateral width W3 of the belt body 35 is, for example, 20 inches to 24 inches. By the width of the belt body 35 being made no less than 20 inches, the snowmobile 1 is especially favorable as a cargo handling vehicle.

A first protrusion column 36, a through hole column 37, a second protrusion column 38, and a third protrusion column 39 are formed from the left to right on an inner circumferential surface 35a of the belt body 35. The first protrusion column 36, the through hole column 37, the second protrusion column 38, and the third protrusion column 39 are arranged at a central portion 35b of the belt body 35 in the right/left direction Y.

The first protrusion column 36 is arranged at a left end of the central portion 35b of the belt body 35 and includes a plurality of protrusions 36a aligned at equal intervals along a circumferential direction C of the belt body 35. Each protrusion 36a is an example of a "protrusion" of the present invention. Each protrusion 36a is formed to a rectangular or substantially rectangular parallelepiped shape, protrudes toward an inner side of the belt body 35 from the inner circumferential surface 35a of the belt body 35, and has a slightly tapered shape.

The second protrusion column 38 is positioned at a right side of the first protrusion column 36. The second protrusion column 38 includes a plurality of protrusions 38a aligned at equal intervals along the circumferential direction C of the belt body 35. Each protrusion 38a is formed to the same shape as the protrusion 36a and protrudes toward the inner side of the belt body 35 from the inner circumferential surface 35a of the belt body 35.

The third protrusion column 39 is positioned at a right side of the second protrusion column 38. The third protrusion column 39 includes a plurality of protrusions 39a aligned at equal intervals along the circumferential direction C of the belt body 35. Each protrusion 39a is formed to the same shape as the protrusion 36a and protrudes toward the inner side of the belt body 35 from the inner circumferential surface 35a of the belt body 35. The protrusions 36a of the first protrusion column 36, the protrusions 38a of the second protrusion column 38, and the protrusions 39a of the third protrusion column 39 are mutually matched in position in the circumferential direction C.

The through hole column 37 is arranged between the first protrusion column 36 and the second protrusion column 38 with respect to the right/left direction Y. The through hole column 37 includes a plurality of through holes 37a aligned at equal intervals along the circumferential direction C of the belt body 35. Each through hole 37a is formed to a rectangular or substantially rectangular shape and penetrates through the belt body 35. With respect to the circumferential direction C, a through hole 37a is arranged between mutually adjacent protrusions 36a.

As shown in FIG. 3, a rotational force is applied to the track belt 9 by engagement of edge portions of each penetrating hole 37a with the left side drive sprocket 26L.

As shown in FIG. 4, a portion of the belt body 35 at the left side relative to the first protrusion column 36 is arranged as a left end portion 35c. A contacting portion 40 is arranged at an inner circumferential surface 351a of the belt body 35 at the left end portion 35c. The contacting portion 40 is a portion of the inner circumferential surface 351a of the belt body 35 at the left end portion 35c that is arranged at the left side of the first protrusion column 36. The contacting portion 40 is arranged across an entire range with respect to the circumferential direction C of the belt body 35 and is arranged to be in rolling contact with the second rotating wheel member 32L and the third rotating wheel member 33L.

Referring to FIG. 1, the track belt 9 includes a lower region 41 that opposes the surface 2a of the ice road 2. The lower region 41 includes a non-grounded region 42 arranged toward the front side of the vehicle body 3 and a grounded region 43 arranged toward the rear side of the vehicle body 3.

The non-grounded region 42 is inclined obliquely upward toward the front with respect to the surface 2a of the ice road 2 and does not contact the surface 2a of the ice road 2. The grounded region 43 extends parallel or substantially parallel to the surface 2a of the ice road 2 and contacts the surface 2a of the ice road 2.

The slide rail 30L is arranged at an inner side of the belt body 35 and extends from the non-grounded region 42 to the grounded region 43 of the lower region 41 of the track belt 9. The grounded region 43 can be grounded to the surface 2a of the ice road 2 reliably by the slide rail 30L pushes the lower region 41 of the track belt 9 downward. The slide rail 30L includes a curved portion 44 arranged at an upper side of the non-grounded region 42 and a rectilinear portion 45 arranged to extend to the rear side from the curved portion 44 and disposed at an upper side of the grounded region 43.

The curved region 44 is arranged to a downwardly-concave, curved shape. The rectilinear portion 45 extends straightly or substantially straightly with respect to the front/rear direction X. A rear end portion 45a of the rectilinear portion 45 is arranged near a rear end portion 43a of the grounded region 41.

Referring to FIG. 4, the slide rail 30L is arranged between the first protrusion column 36 and the second protrusion column 38, and position of the slide rail 30L with respect to the right/left direction Y is matched with the through hole column 37. In the lower region 41, the slide rail 30L is slidably contacted with the inner circumferential surface 35a of the belt body 35.

The first rotating wheel member 31L guides the rotation of the track belt 9 by being in rolling contact with the contacting portion 40 of an inner circumferential surface 352a at the central portion 35b of the belt body 35. The first rotating wheel member 31L is arranged between the second protrusion column 38 and the third protrusion column 39. The first rotating wheel member 31L is rotatably supported on the slide rail 30L via a support shaft 46.

The second rotating wheel member 32L guides the rotation of the track belt 9 by being in rolling contact with the contacting portion 40 of the inner circumferential surface 351a at the left end portion 35c of the belt body 35. The second rotating wheel member 32L is rotatably supported on the slide rail 30L via a support shaft 47. The second rotating wheel member 32L is arranged at the rear side relative to the first rotating wheel member 31L.

The third rotating wheel member 33L guides the rotation of the track belt 9 by being in rolling contact with the contacting portion 40 of the inner circumferential surface 351a at the left end portion 35c of the belt body 35. The third rotating wheel member 33L is rotatably supported on the slide rail 30L via a support shaft 48. The third rotating wheel member 33L is arranged at the rear side relative to the second rotating wheel member 32L, and is matched in position in the right/left direction Y with the second rotating wheel member 32L. A diameter of the third rotating wheel member 33L is greater than a diameter of the second rotating wheel member 32L.

The fourth rotating wheel member 34L guides the rotation of the track belt 9 by being in rolling contact with the inner circumferential surface 352a at the central portion 35b of the belt body 35. The fourth rotating wheel member 34L is arranged between the second protrusion column 38 and the third protrusion column 39. The fourth rotating wheel member 34L is rotatably supported on the slide rail 30L via the support shaft 48. The fourth rotating wheel member 34L and the third rotating wheel member 33L have substantially the same outer diameter.

The third rotating wheel member 33L and the fourth rotating wheel member 34L are arranged so as to oppose the rear end portion 43a of the grounded region 43 of the lower region 41 of the track belt 9.

Figure 5:
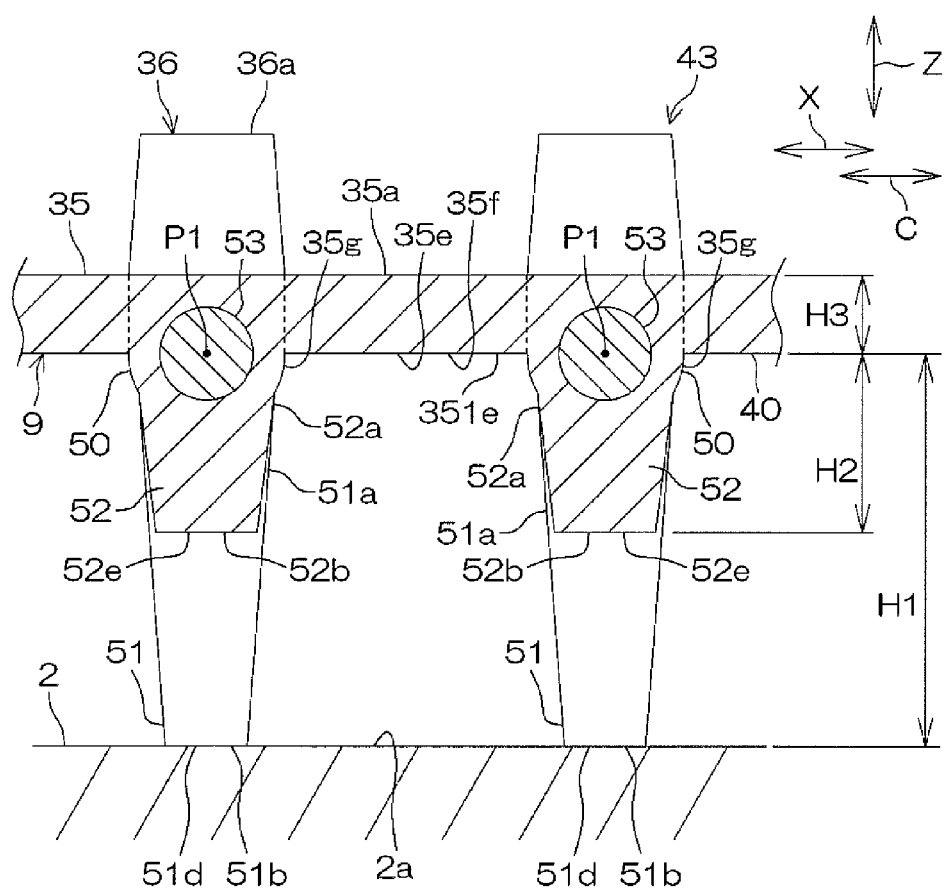
FIG. 5 is sectional view taken along line V-V in FIG. 4 and is a sectional view of the track belt as viewed in a right/left direction.

FIG. 5 is sectional view taken along line V-V in FIG. 4 and is a sectional view of the track belt 9 as viewed in the right/left direction Y. The belt body 35 includes reinforcing member embedded portions 50. Each reinforcing member embedded portion 50 is a portion in which a reinforcing member 53, formed by a metal, etc., is embedded. The reinforcing member embedded portions 50 are arranged at equal intervals in the circumferential direction C and are arranged along the entire circumference of the belt body 35. The positions of the reinforcing member embedded portions 50 in the circumferential direction C are matched with those of the protrusions 36a of the first protrusion column 36.

The reinforcing member 53 is arranged, for example, to a roundbar form and extends across the entire width range or substantially the entire width range of the belt body 35 with respect to the right/left direction Y.

An outer circumferential surface 35e of the belt body 35 includes base surfaces 35f and curved surfaces 35g that are convexly curved toward the outer side of the track belt 9 with respect to the base surfaces 35f.

Each base surface 35f extends horizontally or horizontally in the grounded region 43 of the track belt 9. The base surfaces 35f are arranged at locations of the belt body 35 at which the reinforcing member embedded portions 50 are not provided. Each curved surface 35g is arranged at locations of the belt body 35 at which the reinforcing member embedded portions 50 are provided. Each curved surface 35g protrudes to the outer side of the belt body 35 in accordance with an outer shape of the reinforcing member 53. The curved surface 35g is formed, for example, to a shape arranged from a portion of a cylindrical surface. The base surfaces 35f and the curved surfaces 35g are arranged alternately across the entirety of the belt body 35 with respect to the circumferential direction C.

FIG. 6 is a sectional view of principal portions taken along line VI-VI in FIG. 4 and shows a section of the track belt 9 as viewed in the front/rear direction X. The outer circumferential surface 35e of the belt body 35 includes an outer circumferential surface 351e at the left end portion 35c of the belt body 35 and an outer circumferential surface 352e at the central portion 35b of the belt body 35.

The track belt 9 includes first lugs 51 arranged to protrude from the outer circumferential surface 352e, and second lugs 52 arranged to protrude from the outer circumferential surface 351e and to be short in protrusion length than the first lugs 51.

Each first lug 51 is arranged across the entire range with respect to the right/left direction Y of the outer circumferential surface 352e. As shown in FIG. 5, the first lugs 51 are arranged in plurality at equal intervals with respect to the circumferential direction C. Each first lug 51 is arranged at the curved surface 35g of each reinforcing member embedded portion 50 and extends to the outer side of the belt body 35 from the curved surface 35g.

As shown in FIG. 6, each first lug 51 is formed to a rectangular or substantially rectangular form that is long with respect to the right/left direction Y and includes a base end portion 51a arranged to be connected to the curved surface 35g of the reinforcing member embedded portion 50, a tip edge portion 51b, and an end edge portion 51c.

The tip edge portion 51b includes a flat portion 51d. The flat portion 51d extends flatly or substantially flatly with respect to the right/left direction Y and is in plane contact with the surface 2a of the ice road 2. The flat portion 51d is arranged across the entire range of the tip edge portion 51b with respect to the right/left direction Y.

The end edge portion 51c is arranged at the left end of the first lug 51 and extends so as to be orthogonal to the base surface 35f of the belt body 35 and the flat portion 51d. The end edge portion 51c is arranged at a boundary position B1 between the outer circumferential surface 351e and the outer circumferential surface 352e.

Each second lug 52 is arranged adjacent to the left side of the first lug 51 at each reinforcing member embedded portion 50.

Each second lug 52 is arranged to a small form of rectangular or substantially rectangular shape and includes a base end portion 52a connected to the curved surface 35g of the reinforcing member embedded portion 50, a tip edge portion 52b, a left end edge portion 52c, and a right end portion 52d.

The tip edge portion 52b includes a flat portion 52e. The flat portion 52e extends flatly or substantially flatly with respect to the right/left direction Y and is offset from the surface 2a of the ice road 2. That is, although the flat portion 52e is parallel to the flat portion 51d, it is not in contact with the surface 2a of the ice road 2. The left end edge portion 52c extends so as to be orthogonal to the base surface 35f and flat portion 52e of the belt body 35. The left end edge portion 52c and the left end of the belt body 35 are matched in position with respect to the right/left direction Y.

The right end portion 52d of the second lug 52 is positioned near the boundary position B1 with respect to the right/left direction Y and is continuous with the end edge portion 51c of the first lug 51. By this arrangement, the first lug 51 and the second lug 52 are made continuous in a stepped manner.

Referring to FIG. 5, the second lug 52 is made thinner in thickness with respect to the front/rear direction X with distance away from the outer circumferential surface 35e of the belt body 35. Likewise, the first lug 51 is made thinner in thickness with respect to the front/rear direction X with distance away from the outer circumferential surface 35e of the belt body 35.

Positions of respective centers of the second lug 52, the first lug 51 and the reinforcing member 53 in the circumferential direction C are matched at a central position P1. The central position P1 is disposed along a central axis of the reinforcing member 53.

A height H2 of the second lug 52 is no more than half a height H1 of the first lug 51. The height H1 of the first lug 51 refers to a length with respect to the up/down direction Z from the base surface 35f to the tip edge portion 51b of the first lug 51 in the grounded region 43 of the track belt 9. Likewise, the height H2 of the second lug 52 refers to a length with respect to the up/down direction Z from the base surface 35f to the tip edge portion 52b of the second lug 52 in the grounded region 43 of the track belt 9.

By making the height H2 of the second lug 52 no more than half the height H1 of the first lug 51, the second lug can be prevented from contacting the surface 2a of the ice road 2 without discretion.

The height H1 of the first lug 51 is, for example, no less than 25.4 mm (1 inch). When the height H1 of the first lug 51 is 25.4 mm, the height H2 of the second lug 52 is no more than 12.7 mm. When the height H1 of the first lug 51 is 31.9 mm (1.25 inches), the height H2 of the second lug 52 is no more than 16.0 mm.

Preferably, the height H2 of the second lug 52 is made no more than three times a thickness H3 of the belt body 35. The thickness H3 of the belt body 35 refers to a thickness of the belt body 35 at a portion at which the base surface 35f is arranged. The thickness H3 of the belt body 35 is, for example, 5 mm to 7 mm (0.2 inches to 0.3 inches). In relation to the belt body 35, an upper limit of the height H2 of the second lug 52 is approximately 15 mm to 21 mm.

By the height H2 of the second lug 52 being no more than three times the thickness H3 of the belt body 35, the second lug 52 is made high in flexural rigidity.

As shown in FIG. 6, an outer end circumferential region 54 is arranged by the second lug 52 and the outer circumferential surface 351e. The outer end circumferential region 54 and the contacting portion 40 of the inner circumferential surface 351a of the belt body 35 are overlapped in position in the right/left direction Y. The outer end circumferential region 54 is arranged at a left side of the protrusions 36a and the through holes 37.

As shown in FIG. 4, a lateral width W2 of the outer end circumferential region 54 is no less than 10% and no more than 20% of the lateral width of the track belt 9 (the lateral width W3 of the belt body 35).

By the lateral width W2 of the outer end circumferential region 54 being no less than the above lower limit, a lateral width W1 of the first lug 51 can be prevented from being excessively long. A resistive force that the first lugs 51 of the track belt 9 receives from the surface 2a of the ice road 2 during turning of the snowmobile 1 can thus be prevented from being excessively large.

By the lateral width W2 of the outer end circumferential region 54 being no more than the above upper limit, the lateral width W1 of the first lug 51 can be made adequately long. The propulsive force of the snowmobile 1 that is obtained by the first lugs 51 gripping the surface 2a of the ice road 2 can thus be made adequately large. The lateral width W2 of the second lug 52 of the outer end circumferential region 54 is, for example, 2 inches.

Operations of the snowmobile 1 shall now be explained.

(1) Operations when the Snowmobile 1 Travels on the Ice Road 2

Figure 7A:
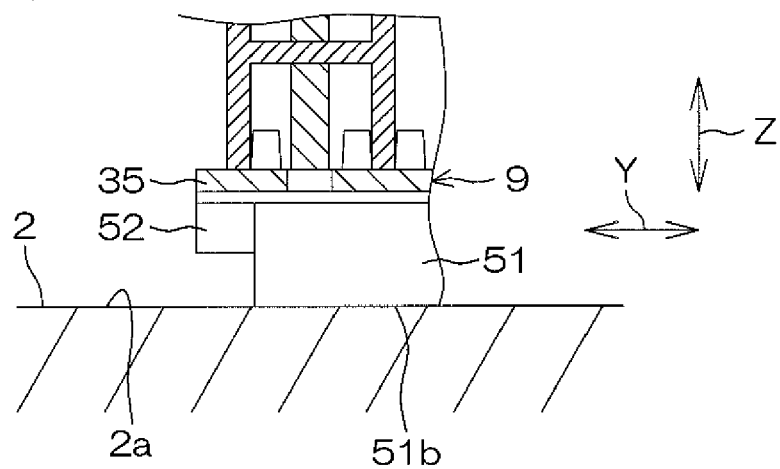
FIG. 7A is a sectional view of principal portions of the track belt as viewed along the front/rear direction in a case where the snowmobile travels on an ice road.
Figure 7B:
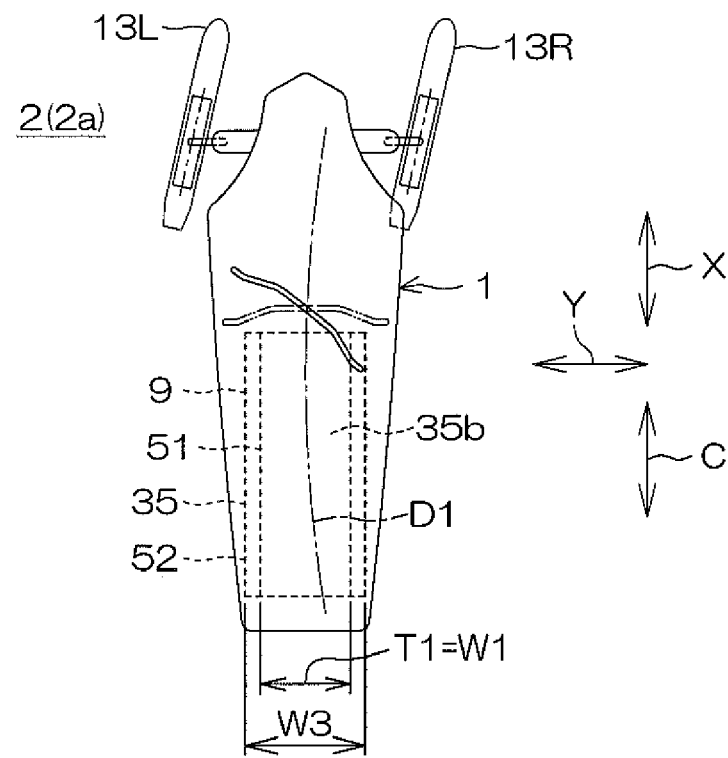
FIG. 7B is a plan view of the snowmobile during travel on the ice road.

FIG. 7A is a sectional view of principal portions of the track belt 9 as viewed along the front/rear direction X in a case where the snowmobile 1 travels on the ice road 2. FIG. 7B is a plan view of the snowmobile 1 during travel on the ice road 2.

In the case where the snowmobile 1 travels on the ice road 2, the tip edge portion 51b of the first lug 51 contacts the surface 2a of the ice road 2 and the second lug 52 and the belt body 35 do not contact the surface 2a as shown in FIG. 7A.

As shown in FIG. 7B, a contact length T1 of the track belt 9 and the surface 2a of the ice road 2 with respect to the right/left direction Y is equal to the lateral width W1 of the first lug 51. The contact length T1 is thus shorter than the lateral width W3 of the belt body 35. By the first lug 51 and the surface 2a of the ice road 2 being in contact, a forward driving force or a reverse driving force is applied to the snowmobile 1.

In a case where the snowmobile 1 turns (for example, turns to the right), the ski members 13R and 13L rotate clockwise about the steering axis from the positions in the rectilinear state. In this process, the snowmobile 1 turns about a circular turning central axis D that passes through the central portion 35b of the belt body 35 in plan view.

In this process, the snowmobile 1 rotatingly drives the first lug 51, which is the portion of the track belt 9 in contact with the surface 2a of the ice road 2, in the circumferential direction C against a resistive force received from the surface 2a. The contact portion at which the track belt 9 contacts the surface 2a of the ice road 2 slips more greatly in the front/rear direction with respect to the surface 2a the closer the portion is to the end portion in the right/left direction Y. The resistive force of the surface 2a that acts on the contacting portion of the track belt 9 increases in proportion to a square of a distance from the turning central axis D1. The second lug 52, which is far from the turning central axis D1, does not contact the surface 2a of the ice road 2.

(2) Operations when the Snowmobile 1 Travels on a Hard-Packed Snow Road 102

The hard-packed snow road 102 is a road formed by hardened snow (hard-packed snow). FIG. 8A is a sectional view of principal portions of the track belt 9 as viewed along the front/rear direction X in a case where the snowmobile 1 travels on the hard-packed snow road 102. FIG. 8B is a sectional view of principal portions of the track belt 9 as viewed along the right/left direction Y in a case where the snowmobile 1 travels on the hard-packed snow road 102. FIG. 8C is a plan view of the snowmobile 1 during travel on the hard-packed snow road 102.

In the case where the snowmobile 1 travels on the hard-packed snow road 102, in addition to the first lug 51 pierces into the hard-packed snow road 102, the second lug 52 pierces into the hard-packed snow road 102 as shown in FIG. 8A. Further, the base surface 35f and the curved surface 35g of the belt body 35 contact a surface 102a of the hard-packed snow road 102.

Here, the base surface 35f of the belt body 35 is in plane contact with the surface 102a as shown in FIG. 8B. Also, the curved surface 35g of the belt body 35 is in plane contact with the surface 102a while pressing the surface 102a downward. The curved surface 35g is not pierced into the hard-packed snow road 102. The contact area of the second lug 52 and the hard-packed snow road 102 is small because the height H2 of the second lug 52 is no more than half the height H1 of the first lug 51. The resistive force that the second lug 52 receives from the hard-packed snow road 102 is thus adequately small in comparison to the resistive force that the first lug 51 receives from the hard-packed snow road 102.

As shown in FIG. 8C, a contact length T2 of the track belt 9 and the surface 102a of the hard packed snow road 102 with respect to the right/left direction Y is equal to the lateral width W3 of the belt body 35. The contact length T2 is thus longer than the contact length T1 when the snowmobile 1 travels on the ice road 2 (see FIG. 7B). By the second lug 52 gripping the hard-packed snow road 102 in addition to the first lug 51 gripping the hard-packed snow road 102, the forward driving force or the reverse driving force is applied to the snowmobile 1.

As shown in FIG. 8A, the position with respect to the right/left direction Y of the contacting portion 40 of the belt body 35 is arranged so as to overlap with the outer end circumferential region 54. Thus, by the third rotating wheel member 33L contacting the contacting portion 40, the outer end circumferential region 54 is reliably pressed against the surface 102a of the hard-packed snow road 102. The practical contact length T2 (stance width) is thereby made long. Thus, as shown in FIG. 8C, in the case where the snowmobile 1 turns (for example, turns to the right), the track belt 9 can contact the surface 102a of the hard-packed snow road 102 at a more left end side of the snowmobile 1.

(3) Operations when the Snowmobile 1 Travels on a Soft Snow Road 202

Figure 9A:
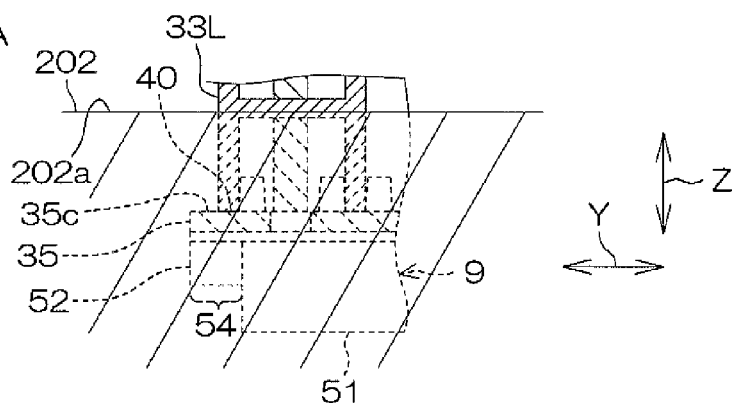
FIG. 9A is a sectional view of principal portions of the track belt as viewed along the front/rear direction in a case where the snowmobile travels on a soft snow road.
Figure 9B:
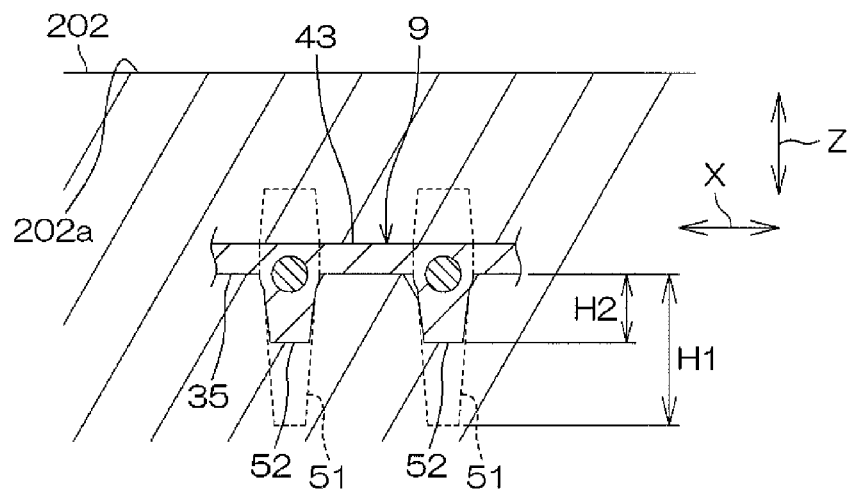
FIG. 9B is a sectional view of principal portions of the track belt as viewed along the right/left direction in the case where the snowmobile travels on the soft snow road.
Figure 9C:
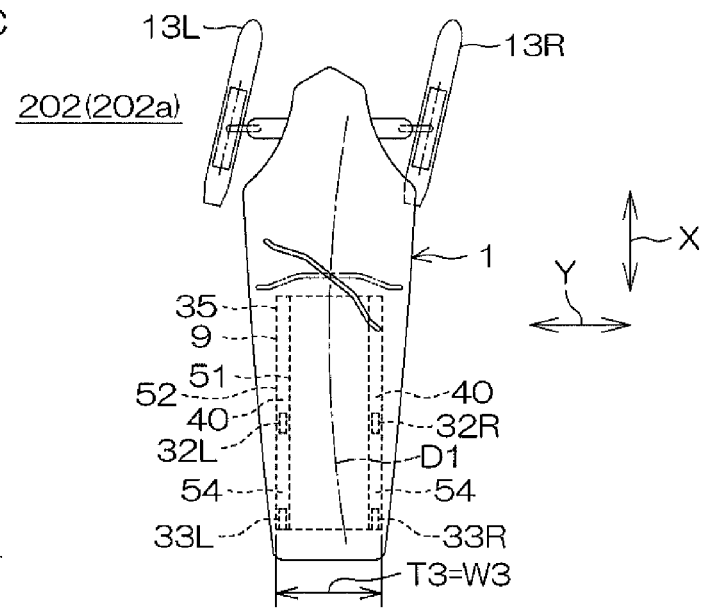
FIG. 9C is a plan view of the snowmobile during travel on the soft snow road.

The soft snow road 202 is a road arranged of soft snow (powder snow). FIG. 9A is a sectional view of principal portions of the track belt 9 as viewed along the front/rear direction X in a case where the snowmobile 1 travels on the soft snow road 202. FIG. 9B is a sectional view of principal portions of the track belt 9 as viewed along the right/left direction Y in the case where the snowmobile 1 travels on the soft snow road 202. FIG. 9C is a plan view of the snowmobile 1 during travel on the soft snow road 202.

In the case where the snowmobile 1 travels on the soft snow road 202, a portion of the lower end side of the snowmobile 1 becomes embedded in the soft snow road 202 due to the weight of the snowmobile 1 itself. Thus, in addition to the belt body 35 of the track belt 9 contacting the soft snow road 202, the first lug 51 and the second lug 52 contact the soft snow road 202.

In this case, as shown in FIG. 9B, the belt body 35 of the grounded region 43, the first lug 51, and the second lug 52 are embedded in the soft snow road 202. The contact area of the second lug 52 and the soft snow road 202 is small because the height H2 of the second lug 52 is no more than half the height H1 of the first lug 51. The resistive force that the second lug 52 receives from the soft snow road 202 is thus adequately small in comparison to the resistive force that the first lug 51 receives from the soft snow road 202.

As shown in FIG. 9C, a contact length T3 of the track belt 9 and the soft snow road 202 with respect to the right/left direction Y is equal to the lateral width W3 of the belt body 35. A buoyant force (normal reaction) that the belt body 35 of the track belt 9 receives from the soft snow road 202 is thus large and sinking of the track belt 9 into the soft snow road 202 is thereby prevented.

As shown in FIG. 9A, the position with respect to the right/left direction Y of the contacting portion 40 of the belt body 35 is arranged so as to overlap with the outer end circumferential region 54. Thus, by the third rotating wheel member 33L contacting the contacting portion 40, the outer end circumferential region 54 is reliably pressed against the soft snow road 202 from above. The left end portion 35c is thereby prevented from deflecting upward upon receiving the buoyant force from the soft snow road 202.

By the second lug 52 gripping the soft snow road 202 in addition to the first lug 51 gripping the soft snow road 202, the forward driving force or the reverse driving force is applied to the snowmobile 1.

As shown in FIG. 9B, with the second lug 52, the height H2 is no more than half the height H1 of the first lug 51. Thus, as shown in FIG. 9C, in the case where the snowmobile 1 turns (for example, turns to the right), the drive resistance that the outer end circumferential region 54 receives from the soft snow road 202 during turning of the snowmobile 1 is small. The snowmobile 1, arranged to include the track belt 9, is arranged to tilt readily to an inner side of the turn (right side in the case of right turning) when the snowmobile 1 is made to turn on the soft snow road 202.

As described above, according to the present preferred embodiment of the present invention, straight travel and turning travel of the snowmobile 1 can be performed readily when traveling on the ice road 2, the hard-packed snow road 102, and the soft snow road 202. Different models thus do not have to be prepared according to regions differing in snow quality and usage modes. The snowmobile 1 can thus be widened in versatility because regions differing in snow quality and usage modes can be accommodated with a single model.

When the snowmobile 1 performs turning travel on the ice road 2, a contact portion of the track belt 9 with respect to the surface 2a of the ice road 2 slips less with respect to the surface 2a of the ice road 2 the closer its location is to the center in the right/left direction Y and slips more in the front/rear direction X with respect to the surface 2a of the ice road 2 the closer its location is to the end portion in the right/left direction Y. Thus, if the outer end circumferential region 54 of the track belt 9 contacts the ice road 2, a large drive loss is caused by the ice road 2 when the snowmobile 1 performs turning travel on the ice road 2.

According to the present preferred embodiment of the present invention, when the snowmobile 1 travels on the ice road 2, although the first lug 51 contacts the surface 2a of the ice road 2, the second lug 52 at the outer end circumferential region 54 does not contact the surface 2a. The first lug 51 is arranged at the central portion 35b of the belt body 35 and is thus small in resistive force due to grazing of the surface 2a of the ice road 2 during the turning of the snowmobile 1.

Thus, when the snowmobile 1 is made to turn on the surface 2a of the ice road 2, the resistive force that the track belt 9 receives from the surface 2a is small and the snowmobile 1 can be turned readily with a small force.

For example, the same turning performance as that when a track belt, which has a lug that is put in contact across its entire range in the right/left direction Y with the surface 2a of the ice road 2 and is a track belt that is 4 inches narrower in lateral width than the track belt of the present preferred embodiment of the present invention, is used can be obtained.

As a result of the resistive force received by the snowmobile 1 from the surface 2a of the ice road 2 being small, a force necessary for steering the ski members 13R and 13L can also be made small.

The flat portion 51d that is flat or substantially flat with respect to the right/left direction Y is arranged at the tip edge portion 51b of the first lug 51. By the flat portion 51d contacting the surface 2a of the ice road 2, the track belt 9 at the grounded region 43 can be prevented from tilting to the right and left. The snowmobile 1 can thus be made to perform straight travel with stability on the ice road 2.

When the snowmobile 1 travels on a hard-packed snow road, the first lug 51 and the second lug 52 are the portions of the track belt 9 that become embedded in the hard-packed snow road 102. On the other hand, the outer circumferential surface 35e of the belt body 35 in the grounded region 43 is put in contact across its entire range in the right/left direction Y with the surface 102a of the hard-packed snow road 102. The contact length T2 (stance width) of the track belt 9 and the surface 102a of the hard-packed snow road 102 can thus be made adequately long. Moreover, the position of the contacting portion 40 with respect to the right/left direction Y is arranged so as to overlap with the outer end circumferential region 54. The outer end circumferential region 54 can thus be pressed against the surface 102a of the hard-packed snow road 102 reliably by the contacting of the second rotating wheel member 32L and the third rotating wheel member 33L with the contacting portion 40. Consequently, the state in which the contact width T2 is long can be maintained more reliably. Riding comfort during turning of the snowmobile 1 can thus be enhanced and the snowmobile 1 can be turned at higher speed and more efficiently.

The first lug 51 that is embedded in the hard-packed snow road 102 is arranged at the central portion 35b of the belt body 35 and is thus small in the resistance received from the hard-packed snow road 102 during turning of the snowmobile 1. Although the second lug 52 is arranged at the outer end circumferential region 54 of the track belt 9 and becomes embedded in the hard-packed snow road 102, the height H2 of the second lug 52 is no more than half the height H1 of the first lug 51.

The resistance that the outer end circumferential region 54 receives from the hard-packed snow road 102 during the turning of the snowmobile 1 is thus small. Thus, even if the first lug 51 and the second lug 52 are embedded in the hard-packed snow road 102, the resistance that the track belt 9 receives from the hard-packed snow road 102 during the turning of the snowmobile 1 is small and the snowmobile 1 can thus be turned readily with a low force.

Further, the outer circumferential surface 35e of the belt body 35 in the grounded region 43 is put in contact across its entire range in the right/left direction Y with the surface 102a of the hard-packed snow road 102. Unintended tilting of the belt body 35 with respect to the surface 102a of the hard-packed snow road 102 can thus be prevented, and the snowmobile 1 can thus be made to perform straight travel with stability on the hard-packed snow road 102.

When the snowmobile 1 travels on a soft snow road, the first lug 51 and the second lug 52 of the grounded region 43 of the track belt 9 become embedded in the soft snow road 202 and the belt body 35 also becomes embedded in the soft snow road 202. The outer circumferential surface 35e of the belt body 35 in the grounded region is then put in contact across its entire range with the soft snow road 202. Moreover, by the second rotating wheel members 32R and 32L and the third rotating wheel members 33R and 33L pressing the contacting portion 40 of the belt body 35 from above, a wide region of the outer circumferential surface 35e of the belt body 35, including the outer end circumferential region 54, can be pressed reliably against the soft snow road 202. Consequently, the buoyant force (normal reaction) that the track belt 9 receives from the soft snow road 202 can be made large. Thus, even during travel on the soft snow road 202, the snowmobile 1 can be driven forward or driven in reverse without becoming stuck and the snowmobile 1 can thus be made to perform straight travel with stability.

Further, although the second lug 52 is arranged at the outer end circumferential region 54 of the track belt 9, the height H2 of the second lug 52 is no more than half the height H1 of the first lug 51. The drive resistance that the outer end circumferential region 54 of the track belt 9 receives from the soft snow road 202 during the turning of the snowmobile 1 is thus small. Consequently, when the snowmobile 1 is made to turn on the soft snow road 202, the entire snowmobile 1, including the track belt 9, can be tilted readily, and the snowmobile 1 can thus be made to perform turning travel readily even during travel on the soft snow road 202.

The first protrusions 36a of the belt body 35 are adjacent to the second rotating wheel members 32R and 32L and the third rotating wheel members 33R and 33L, and these rotating wheel members 32R, 32L, 33R, and 33L are thus prevented from being displaced in the right/left direction Y with respect to the belt body 35. The state where the second rotating wheel members 32R and 32L and the third rotating wheel members 33R and 33L oppose the outer end circumferential regions 54 can thereby be maintained reliably.

The first lug 51 and the second lug 52 of the outer end circumferential region 54 are made continuous in a stepped manner. The first lug 51 and the second lug 52 of the outer end circumferential region 54 are thus partitioned clearly. Thus, on the ice road 2, the state where the first lug 51 contacts the surface 2a of the ice road 2 and the second lug 52 of the outer end circumferential region 54 does not contact the surface 2a of the ice road 2 can be realized reliably. The track belt 9 can be tilted readily when making the snowmobile 1 turn on the ice road 2, the hard-packed snow road 102, or the soft snow road 202. Turning operation of the snowmobile 1 can thus be made easier.

The height H2 of the second lug 52 from the base surface 35f of the belt body 35 is no more than three times the thickness H3 of the belt body 35. According to the height H2 of the second lug 52 being short, the second lug 52 can be made more difficult to deflect. Thus, on the hard-packed snow road 102, the second lug 52 can be pierced into the hard-packed snow road 102 more reliably. The second lug 52 can thus be prevented from deflecting on the surface 102a of the hard-packed snow road 102 and not piercing into the hard-packed snow road 102 due to deflection, and floating of the outer circumferential surface 351e of the outer end circumferential region 54 of the belt body 35 from the surface 102a of the hard-packed snow road 102 can thus be prevented.

On the hard-packed snow road 102, the contact length T2 (stance width) of the track belt 9 can be made adequately long because the outer circumferential surface 351e of the outer end circumferential region 54 is grounded reliably on the surface 102a of the hard-packed snow road 102. The riding comfort during turning of the snowmobile 1 can thus be enhanced and the snowmobile 1 can be turned smoothly at higher speed. Moreover, because the second lug 52 is made difficult to deflect, the second lug 52 can grip the hard-packed snow road 102 with a strong force when the snowmobile 1 performs straight travel. The snowmobile 1 can thus be driven forward or in reverse forcefully on the hard-packed snow road 102.

The tip edge portion 52b of the second lug 52 includes the flat portion 52e that is flat with respect to the right/left direction Y. Thus, when the snowmobile 1 skids on the hard-packed snow road 102 or the soft snow road 202, the flat portion 52e of the second lug 52 can slide smoothly with respect to the hard-packed snow road 102 or the soft snow road 202. The second lug 52 can thus be prevented from piercing into the hard-packed snow road 102 or the soft snow road 202, and a contribution can be made toward enhancing maneuverability when the snowmobile 1 is made to travel while skidding.

The second lug 52 is arranged at the left end portion 35c of the belt body 35 and thus has a large influence on turning performance. The maneuverability of the snowmobile 1 can be improved greatly because the second lug 52 has a structure that can prevent piercing into the hard-packed snow road 102 or the soft snow road 202.

The height H2 of the second lug 52 is no more than three times the thickness H3 of the belt body 35 and the flat portion 52e is arranged at the tip edge portion 52b of the second lug 52. The second lug 52 is thus made difficult to deflect and the tip edge portion 52b of the second lug 52 is made unlikely to pierce into and be caught in the hard-packed snow road 102 or the soft snow road 202. Thus, when the snowmobile 1 is performing straight travel on the hard-packed snow road 102 or the soft snow road 202, the second lug 52 grips the hard-packed snow road 102 or the soft snow road 202 strongly so that the snowmobile 1 can be driven forward or in reverse reliably. Further, when the snowmobile 1 performs skidding travel (turning travel) on the hard-packed snow road 102 or the soft snow road 202, the tip edge portion 52b of the second lug 52 can be made unlikely to pierce into the hard-packed snow road 102 or the soft snow road 202 and the resistance with respect to the right/left direction is therefore low. The snowmobile 1 can thus be made to turn smoothly.

The first lug 51 and the second lug 52 are matched in position in the circumferential direction C with the reinforcing member 53. The belt body 35 can thereby be increased in strength in vicinities of the first lug 51 and the second lug 52. By the reinforcing member 53 being arranged in the vicinities of the first lug 51 and the second lug 52, which are the portions of the track belt 9 that receive a large load from the ice road 2, the hard-packed snow road 102, or the soft snow road 202, the effect of enhancing the strength of the track belt 9 by the providing of the reinforcing member 53 can be enhanced further.

The reinforcing member embedded portion 50 of the belt body 35 includes the curved portion 35g that bulges toward the outer side of the belt body 35 in accordance with the outer shape of the reinforcing member 53. In this case, a thicker reinforcing member 53 can be used and the effect of reinforcing the belt body 35 can be enhanced further.

A tensile force is applied to the belt body 35 by rotation of the sprockets 26R and 26L. The outer end circumferential regions 54 can thus be arranged near portions of the belt body 35 that receive the tensile force from the sprockets 26R and 26L with respect to the right/left direction Y. The outer end circumferential regions 54 can thereby be made unlikely to slacken and a state where the outer end circumferential regions 54 are extended straightly in the grounded region 43 can be maintained readily. Consequently, on each of the ice road 2, the hard-packed snow road 102, and the soft snow road 202, the state of contact of the track belt 9 with the ice road 2, the hard-packed snow road 102, and the soft snow road 202 can be made to approach designed states reliably.

By the above, the snowmobile 1 capable of performing straight travel and turning travel easily when traveling on the ice road 2, the hard-packed snow road 102, and the soft snow road 202 can be realized.

The third rotating wheel members 33R and 33L are arranged to oppose the rear end portion 43a of the grounded region 43. Floating of the track belt 9 at the vicinity of the third rotating wheel members 33R and 33L can thereby be prevented. A state where the rear end portion 43a of the grounded region 43 is located at a more rear side of the snowmobile 1 and respective right and left ends of the grounded regions 43 are located at positions closer to the respective right and left ends of the snowmobile 1 can thus be maintained. A state in which the grounded region 43 is broad can thus be maintained reliably. Thus, when the snowmobile 1 is to be made to perform straight travel, the snowmobile 1 can be driven forward or in reverse forcefully, and in making the snowmobile 1 turn, the turning can be performed at higher speed.

Second Preferred Embodiment

Figure 10A:
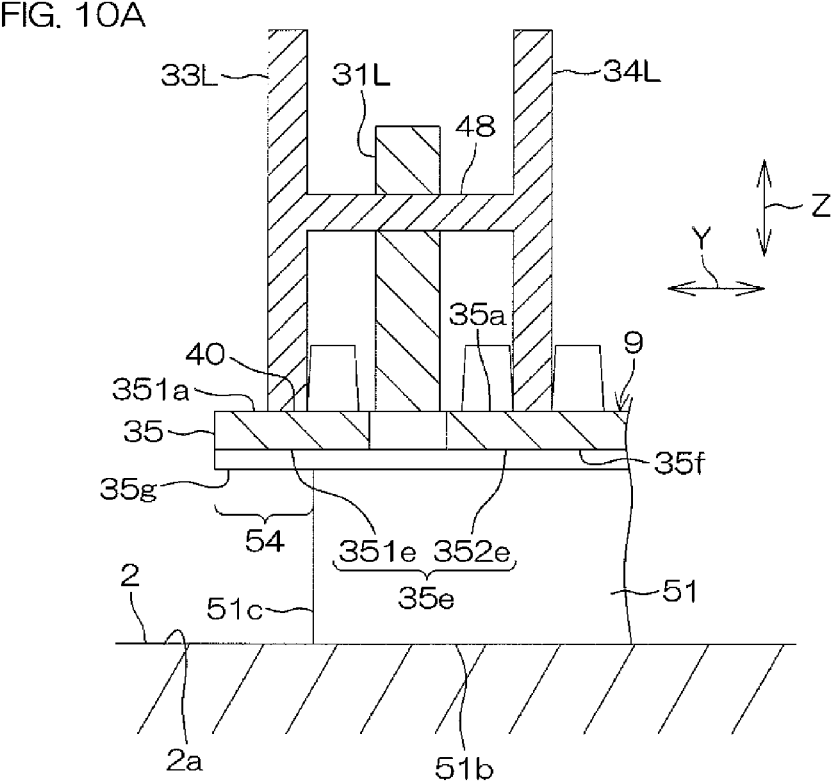
FIG. 10A is a sectional view of principal portions of a second preferred embodiment of the present invention and shows a section of a track belt as viewed in the front/rear direction.
Figure 10B:
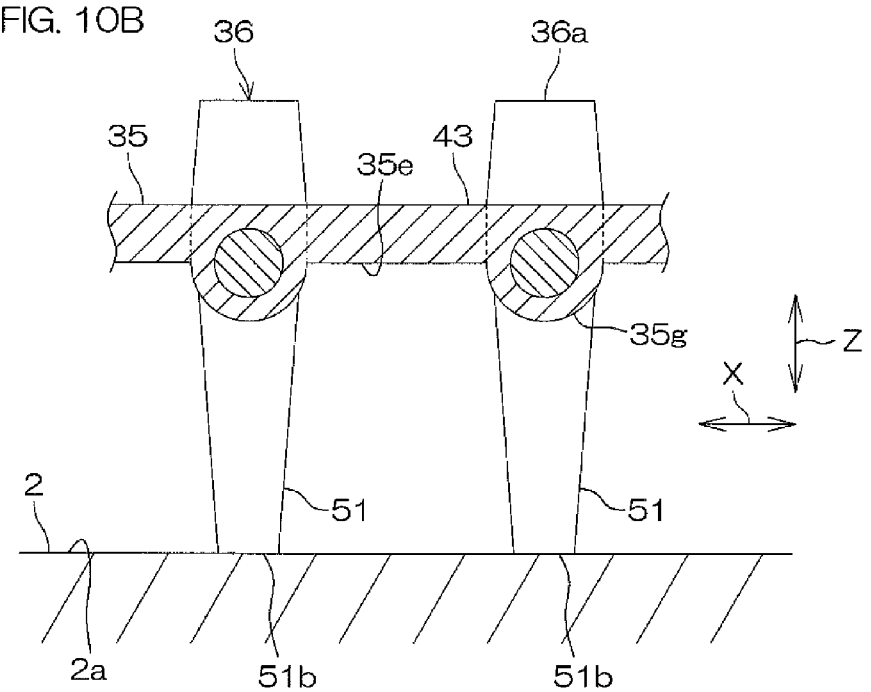
FIG. 10B is a sectional view of the track belt of FIG. 10A as viewed along the right/left direction.

FIG. 10A is a sectional view of principal portions of a second preferred embodiment of the present invention and shows a section of the track belt 9 as viewed in the front/rear direction X. FIG. 10B is a sectional view of the track belt 9 of FIG. 10A as viewed along the right/left direction Y. In the following description, points that differ from the first preferred embodiment of the present invention shall be described. With the second preferred embodiment, arrangements that are the same as those of the first preferred embodiment of the present invention shall be provided with the same symbols and description thereof shall be omitted.

In the present preferred embodiment of the present invention, a lug is not provided at the outer end circumferential region 54. The end edge portion 51c of the first lug 51 and the curved surface 35g of the outer end circumferential region 54 are made continuous in a stepped manner. In the outer end circumferential region 54, the curved surface 35g of the belt body 35 is arranged to a semicircular shape as viewed in the right/left direction Y.

According to the present preferred embodiment of the present invention, when the snowmobile 1 travels on the hard-packed snow road 102, the resistance that the snowmobile 1 receives from the hard-packed snow road 102 during turning is even smaller because a lug is not provided at the outer end circumferential region 54. Thus, even if the first lug 51 is embedded in the hard-packed snow road 102, the resistance that the track belt 9 receives from the hard-packed snow road 102 is small and the snowmobile 1 can be turned readily with a low force.

When the snowmobile 1 travels on the soft snow road 202, the resistance that the snowmobile 1 receives from the soft snow road 202 during turning is small because a lug is not provided at the outer end circumferential region 54. Consequently, when the snowmobile 1 is made to turn on the soft snow road 202, the entire snowmobile 1, including the track belt 9, can be tilted more readily and the snowmobile 1 can thus be made to perform turning travel readily even during travel on the soft snow road 202.

Although a plurality of preferred embodiments of the present invention have been described above, the present invention can be put into practice in yet other modes as well.

For example, although an arrangement where just one first lug 51 is arranged at each reinforcing member embedded portion 50 was described, the present invention is not restricted thereto. A plurality of first lugs 51 that are offset in the right/left direction Y may be arranged at each reinforcing member embedded portion 50.

It suffices that at least a portion of the tip edge portion 51*b* of the first lug 51 have a flat portion, and a portion of the tip edge portion 51*b* does not have to be parallel to the right/left direction Y. Further, the end edge portion 51*c* of the first lug 51 does not have to extend so as to be orthogonal to the base surface 35*f*.

Further, it suffices that at least a portion of the tip edge portion 52*b* of the second lug 52 have a flat portion 52*e*, and a portion of the tip edge portion 52*b* does not have to be parallel to the right/left direction Y. Further, the left end edge portion 52*c* of the second lug 52 does not have to extend so as to be orthogonal to the base surface 35*f*.

Although an arrangement where the entirety of the reinforcing member 53 is embedded in the belt body 35 was described, the present invention is not restricted thereto. For example, a portion of the reinforcing member 53 may be exposed from the belt body 35.

Although an arrangement where each of the first to fourth rotating wheel members 31L to 34L and 31R to 34R is a disk-like roller was described, the present invention is not restricted thereto. For example, at least one of the first to fourth rotating wheel members 31L to 34L and 31R to 34R may be a sprocket that engages with a protrusion arranged on the inner circumferential surface 35*a* of the belt body 35.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A track belt for a snow vehicle, the track belt comprising:
    an endless belt body including an outer circumferential surface and an inner circumferential surface;
    a first lug protruding from the outer circumferential surface, being disposed at a central portion in a right/left direction of the belt body, and including a flat portion that is substantially flat with respect to the right/left direction arranged at a tip edge portion of the first lug, the first lug extending entirely across the central portion, the flat portion extending entirely across the tip edge portion of the first lug such that the first lug has a uniform height entirely across the central portion, wherein the central portion defines a majority of a width of the belt body in the right/left direction;
    outer end circumferential regions provided across an entire range in a circumferential direction of the belt body at both end portions in the right/left direction of the belt body, and including second lugs each having a height from the outer circumferential surface being no more than a half of the height of the first lug, the second lugs being provided only in the end portions in the right/left direction of the belt body; and
    contacting portions provided at the inner circumferential surface such that positions of the contacting portions in the right/left direction overlap with the outer end circumferential regions and being arranged to contact a rotating wheel member that opposes a snow surface across the belt body.

2. The track belt for a snow vehicle according to claim 1, further comprising a protrusion that is arranged to protrude on an inner side of the belt body and is adjacent to the rotating wheel member in the right/left direction.

3. The track belt for a snow vehicle according to claim 1, wherein the first lug includes end edge portions substantially orthogonal to the outer circumferential surface at boundary positions of the outer end circumferential regions, and
    the first lug and the outer end circumferential regions are continuous in a stepped manner.

4. The track belt for a snow vehicle according to claim 1, wherein the height of the second lugs from the outer circumferential surface is no more than about three times a thickness of the belt body.

5. The track belt for a snow vehicle according to claim 1, wherein a tip edge portion of each second lug includes a flat portion that is flat with respect to the right/left direction.

6. The track belt for a snow vehicle according to claim 5, wherein the flat portion of the second lug extends entirely across the tip edge portion of the second lug such that the height of the second lug is uniform entirely across a length of the second lug in the right/left direction.

7. The track belt for a snow vehicle according to claim 5, wherein the central portion defines at least 60% of the width of the belt body in the right/left direction.

8. The track belt for a snow vehicle according to claim 1, further comprising a reinforcing member extending in the right/left direction and at least partially embedded in the belt body, wherein
    the first lug and the second lugs are matched in position in a circumferential direction with the reinforcing member.

9. The track belt for a snow vehicle according to claim 1, wherein a plurality of through holes disposed at both sides of the belt body in the right/left direction, aligned at substantially equal intervals in the circumferential direction and arranged to engage with a sprocket, are provided in the belt body, and
    the outer end circumferential regions are disposed at outer sides of the respective through holes of the belt body in the right/left direction.

10. A snow vehicle comprising:
    a vehicle body;
    the track belt for a snow vehicle according to claim 1 disposed at a lower rear of the vehicle body; and
    a rotating wheel member arranged to contact the contacting portions of the belt body and to oppose a snow surface across the belt body.

11. The snow vehicle according to claim 10, wherein the rotating wheel member is arranged to oppose a rear end portion of a grounded region at which the track belt contacts the snow surface.

12. A track belt for a snow vehicle, the track belt comprising:
    an endless belt body including an outer circumferential surface and an inner circumferential surface;
    a lug protruding from the outer circumferential surface, being disposed at a central portion in a right/left direction of the belt body, and including a flat portion that is substantially flat with respect to the right/left direction arranged at a tip edge portion of the lug, the lug extending entirely across the central portion, wherein the central portion defines a majority of a width of the belt body in the right/left direction;

outer end circumferential regions provided across an entire range in a circumferential direction of the belt body at both end portions in the right/left direction of the belt body, the outer end circumferential regions not including lugs protruding from the outer circumferential surface; and contacting portions provided at the inner circumferential surface such that positions of the contacting portions in the right/left direction overlap with the outer end circumferential regions and being arranged to contact a rotating wheel member that opposes a snow surface across the belt body.

13. The track belt for a snow vehicle according to claim 12, further comprising a protrusion that is arranged to protrude on an inner side of the belt body and is adjacent to the rotating wheel member in the right/left direction.

14. The track belt for a snow vehicle according to claim 12, wherein the lug includes end edge portions substantially orthogonal to the outer circumferential surface at boundary positions of the outer end circumferential regions, and the lug and the outer end circumferential regions are continuous in a stepped manner.

15. The track belt for a snow vehicle according to claim 12, further comprising a reinforcing member extending in the right/left direction and at least partially embedded in the belt body, wherein the lug is matched in position in a circumferential direction with the reinforcing member.

16. The track belt for a snow vehicle according to claim 12, wherein a plurality of through holes disposed at both sides of the belt body in the right/left direction, aligned at substantially equal intervals in the circumferential direction and arranged to engage with a sprocket, are provided in the belt body, and the outer end circumferential regions are disposed at outer sides of the respective through holes of the belt body in the right/left direction.

17. A snow vehicle comprising:
a vehicle body;
the track belt for a snow vehicle according to claim 12 disposed at a lower rear of the vehicle body; and
a rotating wheel member arranged to contact the contacting portions of the belt body and to oppose a snow surface across the belt body.

18. The snow vehicle according to claim 17, wherein the rotating wheel member is arranged to oppose a rear end portion of a grounded region at which the track belt contacts the snow surface.

* * * * *